US011080467B1

(12) United States Patent
Simpson

(10) Patent No.: US 11,080,467 B1
(45) Date of Patent: Aug. 3, 2021

(54) VISUAL TAG BUILDER

(71) Applicant: Quantcast Corporation, San Francisco, CA (US)

(72) Inventor: Somer Simpson, Berkeley, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

(21) Appl. No.: 16/548,603

(22) Filed: Aug. 22, 2019

(51) Int. Cl.
*G06F 40/117* (2020.01)
*G06F 16/958* (2019.01)
*G06F 3/0482* (2013.01)
*G06F 3/0484* (2013.01)
*G06F 40/14* (2020.01)

(52) U.S. Cl.
CPC .......... *G06F 40/117* (2020.01); *G06F 3/0484* (2013.01); *G06F 16/986* (2019.01); *G06F 40/14* (2020.01)

(58) Field of Classification Search
None
See application file for complete search history.

(56) References Cited

U.S. PATENT DOCUMENTS

| | | | | |
|---|---|---|---|---|
| 9,037,963 | B1* | 5/2015 | Chandi | G06Q 20/12 715/234 |
| 9,864,735 | B1* | 1/2018 | Lamprecht | G06F 16/955 |
| 2007/0055569 | A1* | 3/2007 | Subramanian | G06Q 30/0277 705/14.42 |
| 2010/0251095 | A1* | 9/2010 | Juvet | G06F 16/972 715/234 |
| 2011/0066488 | A1* | 3/2011 | Ludewig | G06Q 30/00 705/14.43 |
| 2013/0085871 | A1* | 4/2013 | Goss | G06Q 30/02 705/14.73 |
| 2014/0095324 | A1* | 4/2014 | Cabral | G06Q 30/08 705/14.71 |

(Continued)

FOREIGN PATENT DOCUMENTS

| | | |
|---|---|---|
| WO | WO 2011/041465 | 4/2011 |
| WO | WO 2011/127049 | 10/2011 |

OTHER PUBLICATIONS

PCT/US2020/047145, International Search Report and Written Opinion, dated Nov. 18, 2020.

*Primary Examiner* — Asher D Kells
(74) *Attorney, Agent, or Firm* — Robin W. Reasoner; Andrea Wheeler

(57) ABSTRACT

A tag manager system provides access to a domain in a container in the tag manager system. A tag user navigates to elements in the domain (such as site pages, text elements, graphic elements, or video elements) and selects elements for tagging from within the container. The user selects tag options from within the tag manager system. The tag manager system uses the selected tag options to generate the corresponding tag codes for insertion in the domain HTML code. The tag manager saves previously defined tag codes and the tag user updates stored tag options in the tag manager system. The tag manager system provides pointer codes to insert in the HTML code so the user can update stored tag codes without updating the HTML code. The tag manager further highlights elements of the domain in the container for suggested tagging, and automatically selects option based on the element type.

21 Claims, 8 Drawing Sheets

(56) References Cited

U.S. PATENT DOCUMENTS

| | | | |
|---|---|---|---|
| 2014/0208199 A1* | 7/2014 | Peleg | G06Q 30/0277 715/234 |
| 2016/0019600 A1 | 1/2016 | Smith | |
| 2016/0132931 A1* | 5/2016 | Levinson | G06Q 30/0277 705/14.45 |
| 2016/0267523 A1* | 9/2016 | Biswas | H04L 67/02 |
| 2016/0267524 A1* | 9/2016 | Ng | G06Q 30/0255 |
| 2017/0046737 A1* | 2/2017 | Sachdeva | G06Q 30/0255 |
| 2018/0239826 A1* | 8/2018 | Epstein | G06F 16/951 |

\* cited by examiner

Mode Selection 401

Fig. 6B

VISUAL TAG BUILDER

BACKGROUND

Field of the Invention

The invention relates to the process of generating and installing tag codes on published content sites.

Background

Publishers, content providers, advertisers, and adtech vendors rely on "tags" (or "pixels" or "beacons") to collect information about consumers accessing a published site, such as a web or mobile site, and to provide customized content, such as advertisements, to consumers of the site. A tag comprises tag code (e.g., JavaScript code or script) installed in the HTML code of the published site. When a consumer accesses an element of the site (such as by viewing a page or content on the site) or selects (or "clicks") an element of the site, a tag "fires," causing the browser to execute the corresponding tag code. The tag code defines a name of the tag, the type of the tag, and the action for the browser to take when the tag is fired. In an example, the tag code instructs the browser to send information to the publisher of the site, an advertisement system, a consumption measurement system, or another system. The information includes an identifier of the consumer, browsing history of the consumer, demographic information about the consumer, information about the element accessed, platform information about the published site, browser settings, timezone of the access, geographic location of the access, values associated with the access (e.g., a price of a purchased item), or other information. In another example, the tag code instructs the browser to request custom content, such as an advertisement, to provide to the consumer on the published site.

Operators of published sites and of consumption measurement systems provide tools such as tag management systems to enable tag users (such as publishers, content providers, advertisers, and adtech vendors) to generate tag codes. Some current tag management systems require tag users to navigate to a specific location in the target site to select an element to "tag" (i.e., define the corresponding tag code and install the tag code in the corresponding HTML code). For example, a tag user navigates to a page on a published site and determines that selecting, or clicking on, the text "Add to Cart" is an indicator of a conversion event. The tag user must then return to the tag management system to generate the corresponding tag code. The process of switching back and forth between a published site and a tag manager system is time-consuming. Tag users spend extensive time, often one to three weeks, setting up a new domain by defining and installing tag codes, losing valuable time to collect consumer information or operate advertising campaigns. It is also error-prone as, in moving back and forth between the published site and the tag manager, a tag user may easily overlook an element for tagging or tag an element incorrectly. Missing elements or incorrectly tagging elements reduces the value of information gathered about a domain or about consumers that visit the domain, and reduce the value and effectiveness of advertising campaigns. Furthermore, tag codes generally must be defined and installed by a person technically competent in HTML coding. Non-technical managers of domains or advertising campaigns must wait until technical personnel are available to define and install tag codes, losing valuable time to collect information and to operate advertising campaigns.

What is needed is a tag manager system that provides a mechanism to view and navigate a published site from within the tag manager system, select elements for defining tag codes from within the tag manager system, and generate the tag code for each selected element from within the tag manager system. Such a tag manager system would reduce the amount of time required to generate and install tag codes, reduce errors, and enable non-technical tag users to select and define tags.

SUMMARY

In an embodiment, a tag manager system provides access to a published site in a container, or frame, in the tag manager system, for example, by using an iFrame. The user of the tag manager system (referred to herein as a "tag user") navigates through the published site in the container using normal browser navigation controls; for example, moving a cursor using a mouse or using page up/down or arrow keys. Elements may include site pages, text elements, or graphic elements (including video elements). Using native browser functions, such as developer tool extensions (e.g., Chrome Inspect tools), the tag manager system provides definition controls that enable the tag user to select an element (such as a page, a text element, or a graphical element) of the site for tagging. Upon selection of an element in the published site using definition controls, the tag manager system then provides a tag definitions interface. The tag definitions interface provides tag definition options to the tag user. The tag user may assign a name to the tag code for the selected element. The tag user assigns an action to be taken when a visitor to the site accesses the selected element. The tag manager system may provide default or saved options to the tag user for defining the tag code of the selected element. The tag manager system uses the definitions selected in the tag definitions interface to generate the corresponding tag code. The tag manager system may provide the generated tag code to the tag user for insertion in the corresponding site HTML code.

In an embodiment, defined tag codes are stored in a tag code data store. Upon the tag user accessing an account, the tag manager system may provide a catalog of tags associated with the account that have been previously defined and stored in the tag code datastore. Upon the tag user selecting a tag from the catalog, the tag manager system may provide access to the published site in the container with the selected previously defined tag highlighted, and provide previously defined tag code definitions in the tag definitions interface. This will allow the tag user to review and/or update the selected definition options of the tag in view of the element in the published site from within the tag manager system. In an alternate embodiment, the tag manager system provides access to the published site in the container, with "tagged" elements (i.e., those that have previously defined tag codes) highlighted. Upon the tag user selecting a tagged element using definition controls, the tag manager may provide previously selected tag code definition options in the tag definitions interface. This will allow the tag user to review and/or update the definition options of the tag in view of the element in the published site from within the tag manager system.

The techniques described herein provide many advantages. By enabling a tag user to navigate through a published site from within the tag manager system, without needing to move between the published site and the tag manager system, the tag user will save time. By enabling the tag user to visually select and review tags in the published site, the tag user is less likely to miss elements for tagging or to incorrectly tag elements. By enabling the tag user to select and review previously defined tags in the tag manager system, the tag user is less likely to miss elements for updated tagging. By allowing the tag user to navigate the site using normal navigation controls instead of navigating in the HTML code and by allowing the tag user to select definitions for the tag code using a tag definitions interface instead of HTML code, a non-technical tag user is able to generate tag codes.

In a further embodiment, the tag manager generates a pointer code and provides it to the tag user to insert in the HTML code of the published site instead of the corresponding tag code. The pointer code contains code, or a script, which points to the defined tag code or codes stored in a tag code datastore. When a consumer accesses a tagged element on the published site, the consumer's browser will execute the pointer code, which will cause the browser to retrieve and execute the corresponding tag codes from the tag code datastore. Using this embodiment, a tag user can update a previously defined tag in the tag manager without having to update the tag code installed in the site HTML code. This embodiment, when combined with the above embodiments, provides many advantages. A tag user only needs to install pointer code in their HTML code and then can access, review, and update the corresponding tag code by accessing the published site in the container in the tag manager, saving time and reducing the likelihood of errors. In a particular embodiment, a tag user may only install one pointer code in the HTML code corresponding to a page of the published site that points to the tag codes associated with multiple elements on the page, reducing the time required to install codes in the HTML code and reducing the likelihood of creating conflict errors between tag codes. Finally, a person technically competent in HTML code only needs to install the page pointer code in the site code, while a non-technical person can edit and update the associated tag codes in the tag manager.

The features and advantages described in the specification are not all inclusive and many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 6B is an example of a consent management definition interface, in accordance with an embodiment of the invention.

DETAILED DESCRIPTION

Embodiments of the invention include a method, a system, and a non-transitory computer-readable storage medium storing computer-executable instructions for performing the steps to provide the ability to view and navigate a published domain, or site, from within a tag manager system, select elements of the domain for tagging from within the tag manager, and generate the tag code for each selected element from within the tag manager system. Such a tag manager system reduces the amount of time required to generate and install tag codes, reduces errors in defining tag codes, and enables non-technical tag users to select and define tags.

Figure 1:
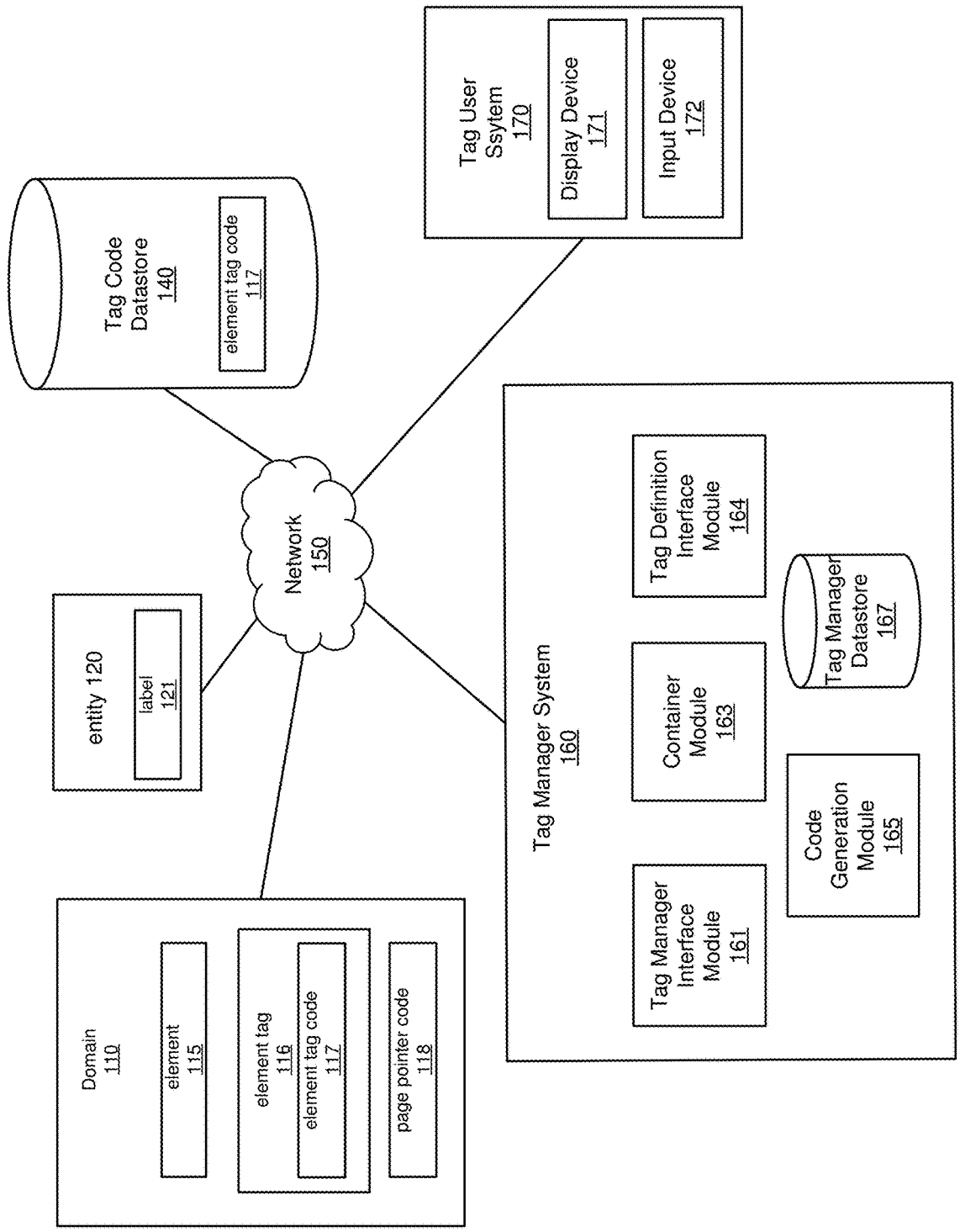
FIG. 1 illustrates an example tag manager computing environment, in accordance with an embodiment.

FIG. 1 illustrates an example computing environment in accordance with an embodiment. As shown in FIG. 1, the computing environment includes domain 110, entity 120, tag code datastore 140, tag user system 170, and tag manager system 160. These elements are connected by communication network 150 such as a local area network, a wide area network, a wireless network, an intranet, a cable network, a satellite network, a cellular phone network, an optical network, the Internet, or combinations thereof.

Domain (or "web domain") 110 may be a media channel which provides content over communications network 150 to entity 120. Examples of domains 110 include web site or mobile site. A domain may comprise sites, sub-sites, or pages. Domain 110 comprises at least one element 115. Although only one element 115 is shown in FIG. 1 for clarity, domain 110 may comprise any number of elements. Domain 110 uses domain development software to create and present domain 110 to entity 120, who accesses domain 110 over the communication network 150. Domain 110 may use markup language to define the structure and elements, such as element 115, of domain 110. Markup language may comprise HyperText Markup Language ("HTML"), LaTex, Extensible Markup Language ("XML"), Generalized Markup Language ("GML"), Standard Generalized Markup Language ("SGML"), or other markup languages. Domain 110 may use a stylesheet language to describe the style corresponding to the markup language, such as HTML, of domain 110. The stylesheet language may comprise Cascading Style Sheet ("CSS"), Document Style Semantics and Specification Language ("DSSSL"), Extensible Stylesheet Language ("XSL"), or other stylesheet languages. Domain 110 may use a scripting language to allow users to perform actions and interact with content on domain 110. The scripting language may comprise JavaScript, Python, Perl, PHP, or other scripting languages. Domain 110 may use other domain development software to create and present domain 110 to entity 120.

Element 115 may be a location in domain 110 such as a web page, a textual element in domain 110 such as the words "Buy It Now", or a graphical element in domain 110 such as a button, an image of a shopping cart, or a video. Element tag 116 corresponding to element 115 comprises element tag code 117 (e.g., a script) that is executed by a browser when entity 120 accesses element 115. When entity 120 accesses element 115, such as viewing or selecting (or "clicking on") element 115, element tag 116 fires, causing the browser to execute tag code 117. Tag code 117 may define a name of element tag 116, a type of element tag 116, and appropriate action for the browser to take when element tag 116 is fired.

In an example, element tag code 117 instructs the browser to send information to the publisher of domain 110, an advertisement system, a consumption measurement system, or another system. The information may include an identifier of the consumer, browsing history of the consumer, demographic information about the consumer, information about the element accessed, platform information about the published site, browser settings, timezone of the access, geographic location of the access, and values associated with the access (e.g., a price of a purchased item). In another example, element tag code 117 instructs the browser to request custom content (e.g., an advertisement) from a content provider (e.g., an advertiser). In an embodiment, element 115 may have more than one element tag 116 associated with it. For example, element 115 may have a first element tag which defines an action (such as sending information) when entity 120 views element 115 and may have a second element tag which defines a different action (such as requesting custom content) when entity 120 selects element 115. Element tag code 117 may be stored with the HTML code that defines element 115 in domain 110.

In an embodiment of this invention, element tag code 117 may comprise a pointer code (not shown). The pointer code contains code (e.g., a script) which points to element tag code 117 stored in tag code datastore 140. In this embodiment, when entity 120 accesses element 115, the browser executes element tag code 117 comprising the pointer code, which will cause the browser to retrieve and execute element tag code 117 from tag code datastore 140. In another embodiment, domain 110 may comprise a page pointer code 118 associated with multiple elements 115 on a page in domain 110. In this embodiment, when entity 120 accesses element 115, the browser executes page pointer code 118, which will cause the browser to retrieve and execute element tag code 117 corresponding to the page in domain 110 from tag code datastore 140.

Entity 120 accesses domain 110 over the communication network 150. Examples of entities 120 include software installations, hardware devices, or both. Software installations may include a web entity instance, video viewer instance, or set-top box software residing on a hardware device. A hardware device may be comprise a computer, personal digital assistant (PDA), cell phone, or set-top unit (STU) such as a STU used in conjunction with cable television service. A consumer is a person or group of people who accesses domain 110. For example, a consumer may operate entity 120 installed on a laptop computer to access domain 110. In some cases, entity 120 comprises a combination of entities which are logically grouped together to represent individuals, households, or groups of individuals who access domain 110. Although only one entity 120 is shown in FIG. 1 for clarity, any number of entities may be connected to the communication network 150.

Label 121 may be stored with entity 120. In an example, label 121 is a hardware device identifier such as a Media Access Control Address (MAC address), which can be stored on a device. In another example, label 121 is a software identifier such as a cookie, which can be stored by a software application (e.g. a browser installed on a computer). Label 121 may be stored on entity 120 or remotely from entity 120. In an example, identifiers do not comprise personally identifiable information (PII) such as a person's name or street address.

Tag code datastore 140 stores element tag codes including element tag code 117 corresponding to element tag 116. Tag code datastore 140 is shown as external to published domain 110 and tag manager system 160, and connected to published domain 110 and tag manager system 160 by communications network 150. However, in other embodiments, tag code data store 140 is internal to domain 110 or tag manager system 160.

Tag user system 170 is a computer that a tag user (such as a publisher of domain 110, content provider, advertiser, and adtech vendor) uses to access tag manager system 160 over communication network 150 to generate or update tag 116 and/or tag code 117. Tag user system 170 may use element tag 116 to collect information about entity 120 such as label 121, another identifier, browsing history, demographic information, and other information about entity 120. Alternatively, tag user system 170 may use element tag 116 to collect information about an access to element 115 in domain 110 such as information about element 115, platform information about domain 110, browser settings, timezone of the access, geographic location of the access, values associated with the access (e.g., a price of a purchased item), or other information. Tag user system 170 may also use element tag 116 to send custom content to domain 110 for access by entity 120.

Tag user system 170 comprises display device 171 and input device 172. Display device 171 displays graphical information provided by tag manager system 160 in a graphical user interface ("interface" or "GUI"). Graphical information includes a tag manager interface and a tag definitions interface as described below with reference to tag manager system 160. Display device 171 comprises a monitor or screen. Input device 172 enables tag user system 170 to provide input to tag manager system 160 in conjunction with display device 171. Input device 172 may be a mouse, track ball, touch screen, keyboard, or other type of input device connected to display device 171. Providing input using input device 172 may comprise clicking a button on a mouse, pushing a key on a keyboard, tapping on a touch screen, or other types of input actions. Tag user system 170 may include additional, fewer, and/or different modules than the ones shown in FIG. 1. Moreover, the functionalities can be distributed among the modules in a different manner than described here.

Tag manager system 160 is a computer that a tag user (such as a publisher of domain 110, content provider, advertiser, and adtech vendor) uses to view and navigate domain 110, select element 115 for tagging, select tag definition options to define or update element tag 116, and generate element tag code 117 and/or page pointer code 118. Tag manager system 160 comprises tag manager interface module 161, container module 163, tag definitions interface module 164, code generation module 165, and tag manager datastore 167. Tag manager system 160 is separate from domain 110 and is hosted on a domain independent of domain 110. Tag manager system 160 may include additional, fewer, and/or different modules than the ones shown in FIG. 1. Moreover, the functionalities can be distributed among the modules in a different manner than described here.

Tag manager interface module 161 of tag manager 160 generates a tag manager interface and provides the tag manager interface for display on display device 171. The tag manager interface provides user account options for selection by tag user system 170, and displays a container and a tag definitions interface, as described below with reference to FIG. 2. Container module 163 of tag manager system 160 generates a container interface to display a domain, such as domain 110, for display in the tag manager interface and enables tag user system 170 to view and select elements for tagging, as described below with reference to FIG. 2.

Container module 163 accesses the HTML code, JavaScript code, and cascading style sheets corresponding to domain 110, as needed. Container module 163 accesses browser developer tools (i.e., native browser functions, such as developer tool extensions), as needed. Tag definition interface module 164 of tag manager system 160 generates a tag definition interface and provides the tag definition interface for display in the tag manager interface. The tag definition interface provides tag definitions options for selection by tag user system 170, as described below with reference to FIG. 3. Code generation module 165 of tag manager 160 generates a code generation selection interface for display in the tag definition interface. The code generation selection interface provides code generation options for selection by tag user system 170 and generates corresponding tag codes, as described below with reference to FIG. 3. Tag manager datastore 167 of tag manager 160 may store information required by tag manager system 160 to generate the tag manager interface 200 and/or tag code 117 and/or page pointer code 118, as described below with reference to FIG. 3.

Figure 2:
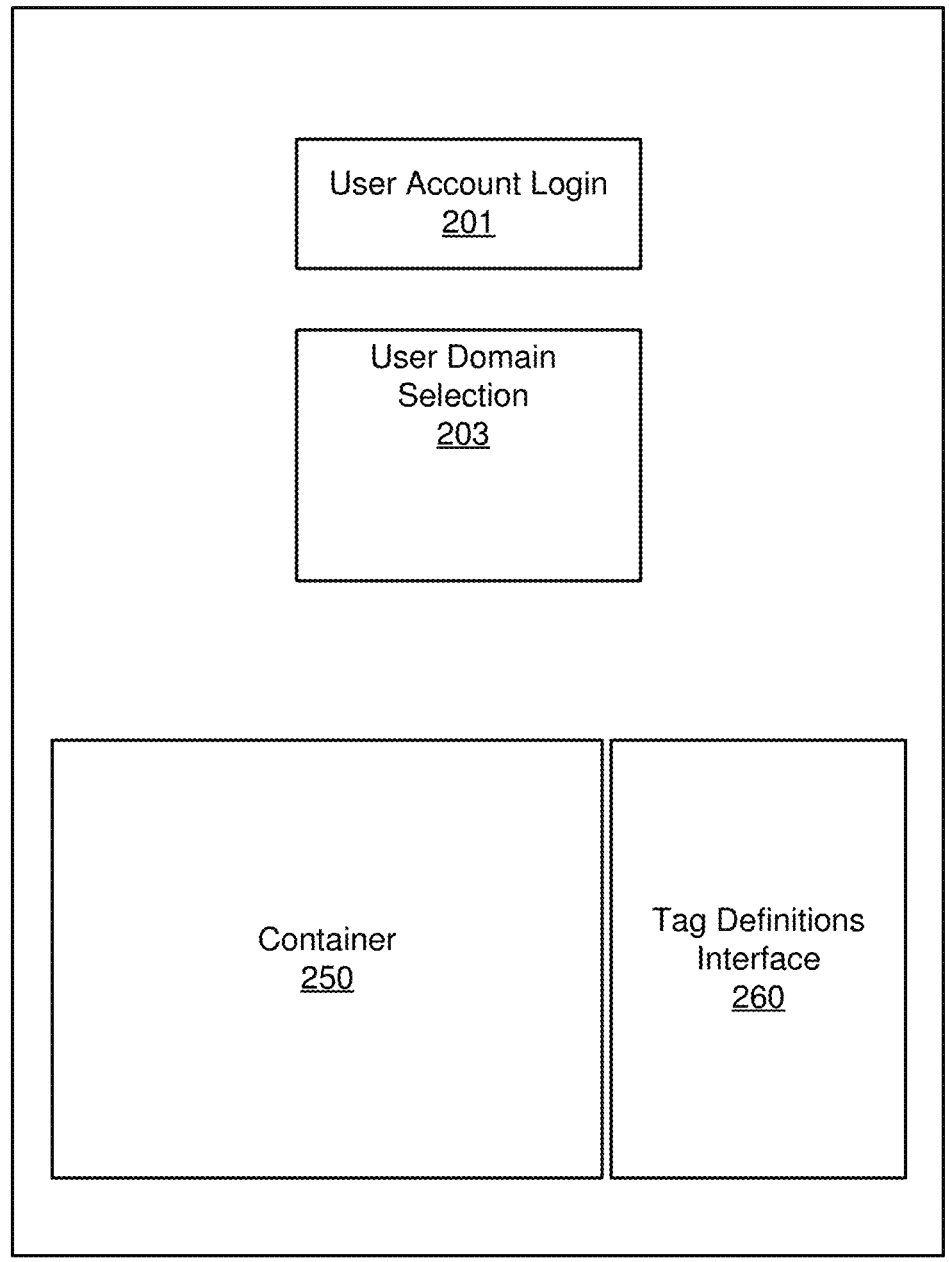
FIG. 2 is an example of a tag manager interface, in accordance with an embodiment of the invention.

FIG. 2 illustrates tag manager interface 200, according to an embodiment of the invention. Tag manager interface module 161 generates tag manager interface 200 and provides the tag manager interface 200 for display on display device 171. Tag user 170 uses input device 172 to provide inputs to tag manager system 160 in conjunction with tag manager interface 200 displayed on display device 171. Tag manager interface 200 includes the following interfaces: user account login 201, user domain selection 203, container 250, and tag definitions 260. Tag manager interface 200 may include more, fewer, and/or different interfaces than the ones shown in FIG. 2. Moreover, the functionalities can be distributed among the interfaces in a different manner than described here.

User account login 201 provides tag user login options. Tag user account login options provide tag user system 170 the option to create a new tag user account or log into an existing tag user account in tag manager system 160. Once tag user system 170 has an account in tag manager system 160, tag user system 170 associates one or more domains 110 with the account.

User domain selection 203 provides user domain selection options. User domain selection options provide tag user system 170 with the option to identify a new domain associated with the account or select a previously defined domain. Identifying a new domain comprises providing the Uniform Resource Locator (or "URL") corresponding to domain 110 to tag manager system 160. Tag manager system stores the URL in tag code data store 140 and/or tag manager datastore 167.

Container 250 displays the domain or site selected in user domain selection interface 203, such as domain 110. Container module 163 may use an embedding construct such as an xHTML inline container, or frame element, or "iFrame," installed in the HTML code of tag manager interface 260 to request and obtain access to domain 110, and to display the domain 110 in container 250. Container module 163 retrieves the URL corresponding to domain 110 from tag code datastore 140 and/or tag manager datastore 167 and inserts the obtained URL into the iFrame code to request and obtain access to domain 110. Container module 163 displays domain 110 in container 250 according to the corresponding HTML, JavaScript code and cascading style sheets (CSS) of domain 110. Alternatively, tag manager system 160 may use other embedding constructs such as an Ajax XMLHttpRequest object or HTML5 objects.

Figure 3:
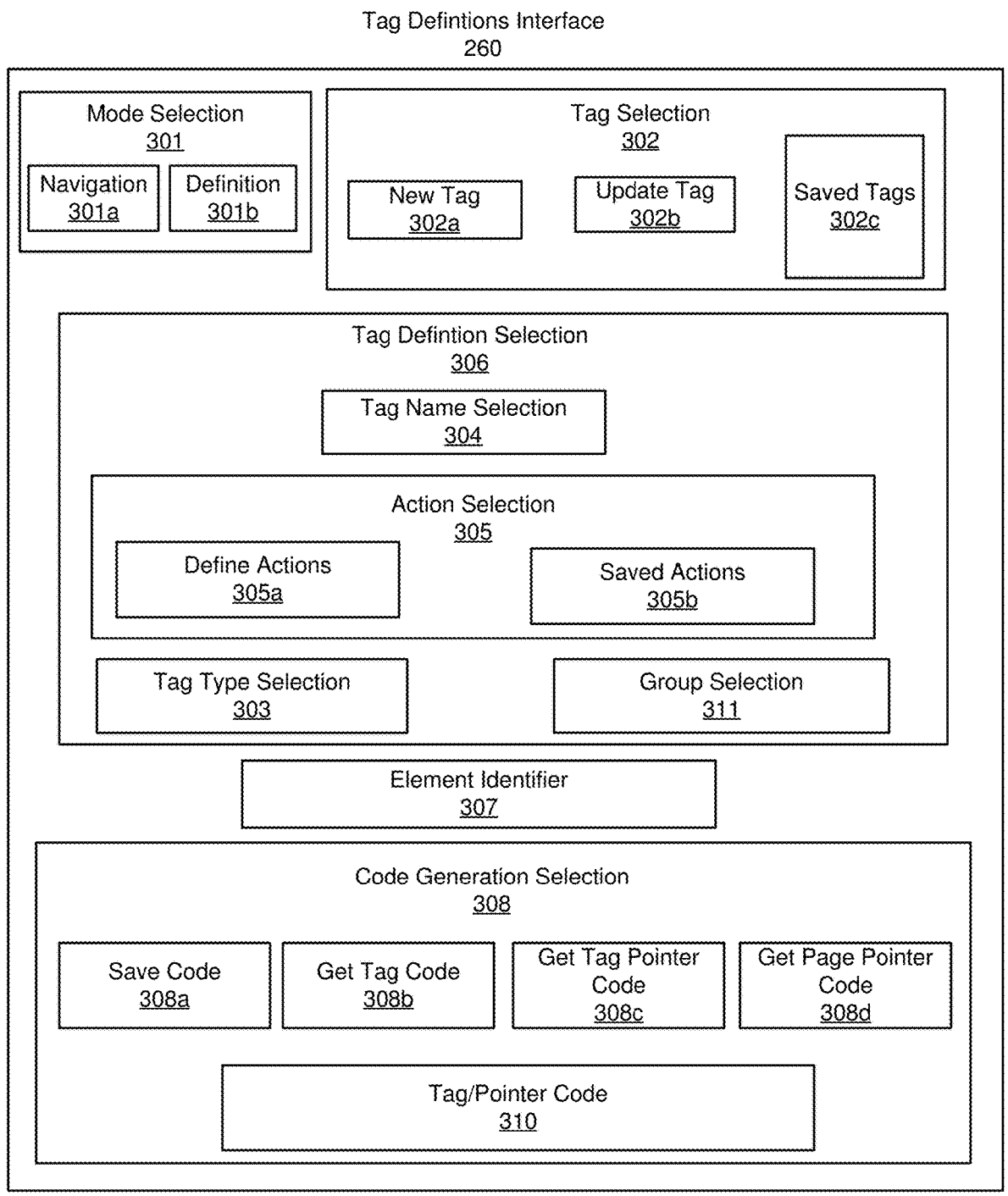
FIG. 3 is an example of a tag definitions interface, in accordance with an embodiment of the invention.

FIG. 3 illustrates tag definition interface 260, according to an embodiment of the invention. Tag definition module 163 of tag manager system 160 generates tag definition interface 260 for display on display device 171. Tag user system 170 uses input device 172 to provide inputs to tag manager system 160 in conjunction with tag definition interface 260 displayed on display device 171. Tag definition interface 260 provides various interfaces to display tag definition options for selection by tag user system 170. Code generation module 165 uses the definition options selected by tag user system 170 to define tag code 117 and/or page pointer code 118, as described below. Tag definition interface 260 comprises the following interfaces: mode selection 301 provides options to select navigation or definition mode; tag selection 302 provides options to define a new tag or update a previously defined tag; tag definition selection 306 provides options to define a new tag type or select a preconfigured tag type, define a new action to be assigned to element tag 116 or select a preconfigured action, define a new tag type or select a preconfigured tag type, and define a new group or select a preconfigured group; element identifier 307 provides a unique identifier for each element 115; and code generation selection 308 provides options to generate element tag code 117 and/or page pointer code 118, and provide them to tag user 170. Tag definition interface 260 may include more, fewer, and/or different interfaces than the ones shown in FIG. 3. Moreover, the functionalities can be distributed among the interfaces in a different manner than described here.

Tag definition interface module 163 of tag manager system 160 may generate tag definitions interface 260 when tag user system 170 logs into a tag user account and/or selects domain 110. Alternatively, tag definitions interface module 163 may generate tag definitions interface 260 when tag user system 170 has selected element 115 for tagging in container 250. Tag definition interface 260 includes the following interfaces, described in more detail below: mode selection 301, tag selection 302, tag type definition 306, element identifier 307, and code generation selection 308. Tag definition interface 260 may include more, fewer, and/or different interfaces than the ones shown in FIG. 3. Moreover, the functionalities can be distributed among the interfaces in a different manner than described here.

Mode selection 301 of tag definition interface 260 allows the tag user to select between a navigation mode 301a and a definition mode 301b. Tag user 170 may select navigation mode 301a in mode selection 301. When navigation mode is selected, tag user system 170 uses input device 172 to navigate and take actions in domain 110 displayed in container 250 using normal browser navigation controls. Normal browser navigation controls may include using input device 172 to change the page of domain 110 displayed in container 250, or to move a cursor in and to select elements of domain 110 displayed in container 250. For example, in navigation mode, if element 115 is a link to a checkout page, tag user system 170 uses input device 172 to navigate to element 115 of domain 110 displayed in container 250 and take an action using input device 172 (e.g., click a button on a mouse or tap a touchscreen) to select element 115; container module 163 will retrieve the page in domain 110 corresponding to the checkout page, and display the checkout page in container 250.

Tag user system 170 may select definition mode 301b in mode selection 301. When definition mode is selected, tag user system 170 uses input device 172 to select navigate and take actions in domain 110 using definition controls to select element 115 for tagging. Definition controls may make use of native browser functions, such as developer tool extensions (e.g., Chrome Inspect tools), to enable tag user system 170 to select and define tag 116 for element 115 in domain 110. When tag user system 170 selects definition mode 301b, container module 153 activates browser development tools (i.e., native browser functions, such as developer tool extensions) to access HTML code corresponding to domain 110. With browser development tools activated, tag user system 170 uses input device 172 to select element 115 for tagging using definition controls. In an example, tag user system 170 uses input device 172, such as a mouse, to move a cursor over a graphical element 115 in contain 250; clicking the right mouse button while the cursor is over graphical element 115 "selects" the element 115 for tagging. In another example, tag user system 170 uses input device 172, such as a mouse, to move a cursor to any location on a page of domain 110 in container 250; clicking the right button on the mouse selects page element 115 for tagging. If element 115 is a link to a new URL, container module 163 will use native browser functions to override the HREF tag in the HTML code of domain 110 to select element 115 for tagging instead of retrieving and displaying the content corresponding to the link. Container module 163 may use browser development tools to access and retrieve HTML code corresponding to element 115 from domain 110 and provide the retrieved HTML code to code generation module 165 to generate corresponding tag code 117 (see description of code generation module 165 below).

When tag user system 170 selects element 115 for tagging, container module 163 may generate a "highlight" of selected element 115 in container 250 to visually indicate that element 115 is selected for tagging. Container module 163 may generate a Cascading Style Sheet (i.e., "CS S" or "style sheet") to create style sheet rules to produce highlights for selected elements 115 in container 250. Container module 163 may override the style sheet corresponding to domain 110 with the new style sheet for display in container 250. As an example of highlighting, container module 163 generates a colored box or shaded/colored background around element 115 to indicate element 115 is selected for tagging. When tag user system 170 completes definition of element tag 116 corresponding to element 115, container module 163 may generate a different highlight of element 115 to visually indicate that element 115 is tagged. As an example, container module 163 generates a differently colored or shaded/colored background around tagged element 115. In another embodiment, container module 163 may generate a definitions snapshot, or image, displaying some or all selected tagged definitions corresponding to tagged element 115. In an example, container module 163 generates a definitions snapshot when tag user system 170 accesses a tagged element 115 in container 250, for example, by moving a cursor over tagged element 115 in container 250. Advantageously, highlighting tagged elements enables tag user system 170 to identify tagged elements 115 in domain 110 more quickly to review and/or update the corresponding selected tag definition options. This reduces the likelihood that tag user system 170 will miss element 115 or incorrectly tag element 115.

Tag selection 302 of tag definition interface 260 enables tag user system 170 to select options to define a new tag or update a previously defined tag. In an embodiment, when tag user system 170 selects new tag 302a in tag selection 302, tag definitions interface module 164 generates tag definition selection 306 with no tag definition options selected. In another embodiment, when tag user system 170 selects update tag 302b in tag selection 302, tag definitions interface module 164 generates tag definition selection 306 with the tag definitions options populated with the selections previously saved by code generation module 165 corresponding to a previously defined element 115, element tag 116, or element tag type. In an example, upon tag user system 170 accessing a previously created account and/or domain, tag manager system 160 provides a catalog of previously defined elements 115 and/or element tags 116 in saved tags 302c; tag user system 170 selects a previously defined element 115 and/or element tag 116 from the catalog and tag definitions interface module 164 then generates tag definition selection 306 with the tag definitions options populated with the tag definitions options corresponding to the selected previously defined elements 115 and/or element tags 116. In another example, upon tag user system 170 accessing a previously created account and/or domain, container 250 displays domain 110 with previously tagged element 115 highlighted; tag user system 170 selects highlighted element 115 in container 250; tag definitions interface module 164 then generates tag definition selection 306 with the tag definition options populated with the tag definition options corresponding to the previously defined elements 115 and/or element tags 116.

Tag definition selection 306 of tag definition interface 260 provides various interfaces to display options to define element tag 116 by tag user system 170. Tag definition selection 306 comprises the following interfaces: tag name selection 305 provides options to select input a tag name or select a saved name corresponding to element tag 116; action selection 305 provides options to define a new action or select a saved action for a browser to take when entity 120 accesses tagged element 115; tag type selection 303 provides options to define a new tag type or select a saved tag type corresponding to element tag 116; group selection 311 provides options to define a group or select a saved group corresponding to element tag 116.

Tag name selection 304 of tag definition interface 260 provides tag name options or allows tag user system 170 to input a tag name corresponding to element tag 116. Tag management system 160 may automatically populate tag name selection 304 with the corresponding unique element identifier, as described below with reference to element identifier 307. Tag user system 170 may use the corresponding unique element identifier, or input a tag name. Tag manager system 160 stores the selected tag name in tag manager datastore 167. Tag manager system may auto-populate tag name selection 304 with a previously selected tag name when tag user 170 selects a previously tagged element 115 in container 250.

Action selection 305 of tag definition interface 260 provides options to define the action a browser takes when entity 120 accesses tagged element 115. In an example, tag actions include sending information to a publisher of domain 110, an advertisement system, a consumption measurement system, or another system. The information may include an identifier of the consumer, browsing history of the consumer, demographic information about the consumer, information about the element accessed, platform information about the published site, browser settings, timezone of the access, geographic location of the access, and values associated with the access (e.g., a price of a purchased item). In another example, tag actions instruct the browser to request custom content, such as an advertisement, to provide on domain 110 for access by entity 120. In an embodiment, tag user system 170 selects options in define action 305a to define new tag actions corresponding to element 115. Upon completing a definition of new tag actions, tag manager system 160 stores the action in tag code datastore 140 and/or tag manager datastore 167. Tag definition interface module 164 may display the defined action in saved action 305*b*. In another embodiment, tag user system 170 selects previously defined actions displayed in saved action 305*b* to define tag actions corresponding to element 115. Upon tag user system 170 completing option selections to define tag actions corresponding to element 115, tag manager system 160 stores the defined element tag 116 in datastore 140 and/or tag manager datastore 167. Tag definition interface module 164 may display the defined element 115 and/or defined element tag 116 in saved tag 302*c*.

Tag type selection 303 of tag definition interface 260 provides options to define a tag type or select a saved tag type corresponding to element tag 116. In one embodiment, upon completing selection of options to define tag code 116 corresponding to element 115, tag user system 170 inputs a name of a type of tag in tag type selection 303. In an example, upon completing selection of options for element tag 116 corresponding to an event where entity 120 clicks on a textual element 115 such as "Buy Now," tag user system 170 may enter "conversion" type in tag type selection 303. Other types of conversion activities may correspond to events where entity 120 selects element 115 where element 115 is a link to view an advertisement, or selects a link to send an email to an advertiser. In another example, upon completing selection of options for element tag 116 corresponding to an event where entity 120 navigates to a page in domain 110, tag user system 170 may enter "view" type in tag type selection 303. Other types of view events may correspond to events where entity 120 navigates to a page in domain 110 or selects a link to view an advertisement may be defined as a view tag type. Other types of events may correspond to "purchase" types, "lead" types, or "subscription" types. Upon entering a new tag type in tag type selection 303, tag manager system 160 stores the tag type and corresponding actions in tag code data store 140 and/or tag manager datastore 167. In another embodiment, tag management system 160 provides preconfigured tag types; for example, tag management system 160 may preconfigure actions associated with specific tag types (such as conversion and view tag types) and store the preconfigured tag types and corresponding actions in tag code data store 140 and/or tag manager datastore 167. When tag user system 170 selects new tag 302*a* or update tag 302*c* in tag selection interface 302, tag definitions interface module 164 populates tag type selection 303 with tag types previously defined by tag user system 170 and/or preconfigured by tag management system 160. Upon tag user system 170 selecting a preconfigured tag type, tag definition module 164 auto-populates the options in tag definition selection interface 306 with the options corresponding to the selected tag type.

Group selection 311 of tag definition interface 260 provides options to define a group or select a saved group corresponding to element tag 116. In one embodiment, tag management system 160 defines actions and tag types typically used by a group; for example, by a publisher of domain 110 as part of a "publisher" group, and by a marketer or advertiser as part of a "advertiser" group. In an alternate embodiment, tag user system 170 defines actions belonging to each group. In an embodiment, group selection 311 provides options for tag user system 170 to select a group, such as publisher group or marketer group. In another embodiment, tag manager 160 will determine the group based on the account associated with tag user system 170. Tag definitions interface module 164 may then populate saved actions 305*b* and tag type selection 303 with actions and/or types corresponding to their selected and/or determined group. Some tag definition options may not be available in all groups.

Element identifier 307 of tag definition interface 260 displays a unique element identifier corresponding to selected element 115. Container module 163 accesses the HTML code corresponding to element 115 and retrieves the identifier corresponding to selected element 115. In an example, selected element 115 is a page in domain 110 and the corresponding element identifier is the page URL, which is unique for each element 115 where element 115 corresponds to a page. In this example, the page URL is the unique element identifier and is displayed in element identifier 307. In another example, selected element 115 is an object and the corresponding element identifier comprises the corresponding CSS element ID and/or class. In this example, tag manager system 160 generates a random number and appends it to the element identifier corresponding to element 115, resulting in a unique identifier for each element 115 where element 115 corresponds to an object. In this example, the generated unique identifier is displayed in element identifier 307.

Code generation selection 308 of tag definition interface 260 provides code generation options including save code 308*a*, get tag code 308*b*, get tag pointer code, 308*c*, get page pointer code 308*d*, and tag/pointer code 310. When tag user system 170 selects save code 308*a*, code generation module 165 saves generated element tag code 117 in tag code datastore 140 and/or in tag manager datastore 167. When tag user system 170 selects get tag code 308*b*, code generation module 165 retrieves element tag code 117 from tag code datastore 140 and/or tag manager datastore 167 and enables generated element tag code 117 to be displayed in tag/pointer code 310 on display device 171. When tag user system 170 selects get tag pointer code 308*c*, code generation module 165 saves generated element tag code 117 at least in tag code datastore 140 and possibly tag manager datastore 167, generates pointer code corresponding to tag code 117, and enables generated pointer code corresponding to element tag code 117 to be displayed in to be displayed in tag/pointer code 310 on display device 171. When tag user system 170 selects get page pointer code 308*d*, code generation module 165 saves generated element tag code 117 at least in tag code datastore 140 and possibly tag manager datastore 167, generates page pointer code 118, and enables generated page pointer code 118 to be displayed in tag/pointer code 310 on display device 171.

Code generation module 165 provides the generated element tag code 117 and/or page pointer code 118 for insertion in the HTML code corresponding to element 115 in domain 110. In one embodiment, code generation module 165 provides the code for display in tag/pointer code 310; tag user system 170 may copy the displayed element tag code 117 and/or page pointer code 118 for insertion in the corresponding HTML code. In other embodiments, code generation module 165 provide the generated tag code 117 and/or page pointer code 118 to tag user system 170 over network 150, or provides the generated tag code 117 and/or page pointer code 118 to domain 110 over network 150, for insertion in the corresponding HTML code. Tag code 117 (or the corresponding pointer code) is inserted in the HTML code corresponding to element 115 in domain 110; page pointer code 118 is inserted in the HTML code corresponding to the page containing element 115 in domain 110. When page pointer code 188 is inserted in HTML code corresponding to a page in domain 110, individual elements 115 may not have tag code and or pointer code inserted in the HTML code. When entity 120 accesses element 115, such as viewing content associated with element 115 or selecting element 115, element tag 116 fires, which causes the browser to execute tag code 117. In an embodiment, element tag code 117 comprises pointer code. When entity 120 accesses element 115, element tag 116 fires, causing the browser to execute the pointer code, which causes the browser to retrieve and execute element tag code 117 from tag code datastore 140. Tag code 117 will execute according to the saved tag definitions. In an embodiment where a page in domain 110 comprises page pointer code 118, when entity 120 accesses element 115, page pointer code 118 will fire, causing the browser to execute the pointer code, which causes the browser to retrieve and execute element tag code 117 from tag code datastore 140. Tag code 117 will execute according to the saved tag definitions.

Tag manager datastore 167 of tag manager system 160 stores information required by tag manager system 160 to generate tag manager interface 200 and/or tag code 117 and/or page pointer code 118. In examples, tag manager system 160 stores a URL corresponding to domain 110, HTML code corresponding to domain 110 and/or element 115, element tag code 117, pointer code corresponding to element tag code 117 and/or page pointer code 118 corresponding to element 115, or other data and information as needed. In some embodiments, tag manager system uses tag code datastore 140 to store all information required by tag manager system 160. In other embodiments, tag manager system uses tag manager datastore 167 to store some information.

Figure 4:
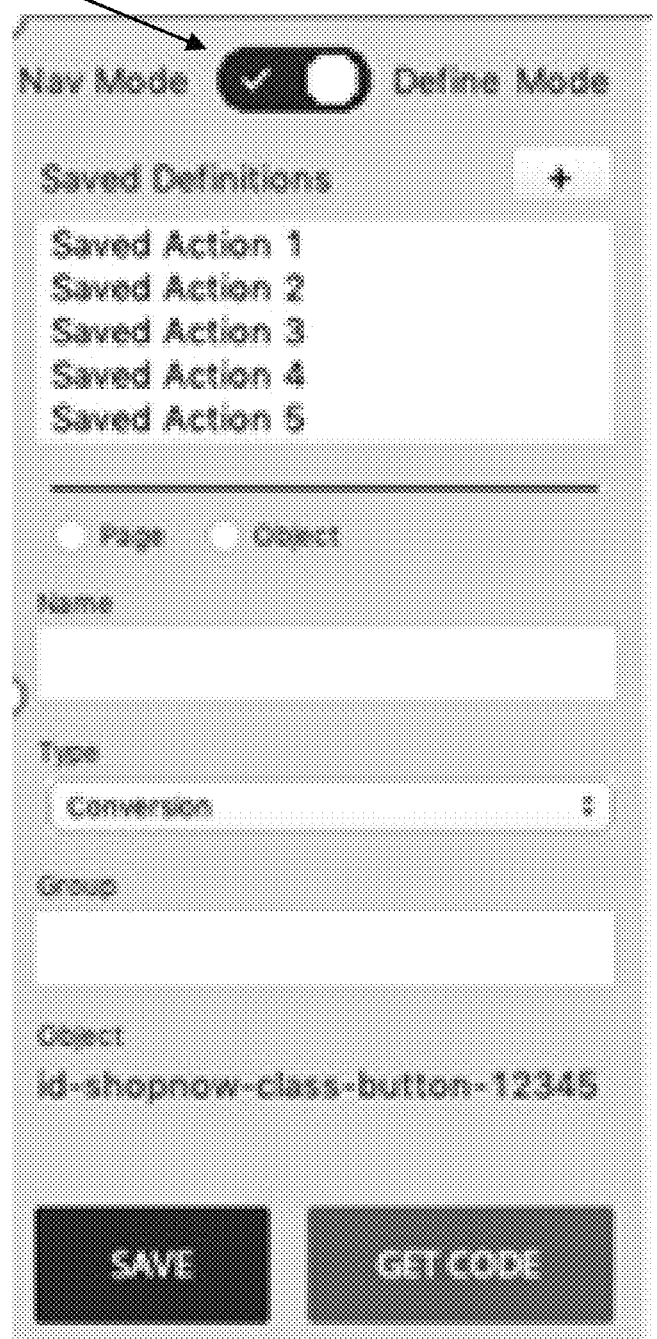
FIG. 4 is an example of a tag definition interface, in accordance with an example embodiment of the invention.

FIG. 4 illustrates an example embodiment of tag definitions interface 260. FIG. 4 comprises elements that correspond to elements tag definition interface 260. For example, mode selection 401 in FIG. 4 corresponds to mode selection 301 in FIG. 3. As illustrated by FIG. 4, tag definition interface 260 may include more, fewer, and/or different interfaces than the ones shown in FIG. 3. Moreover, the functionalities can be distributed among the interfaces in a different manner than described in FIG. 3.

Figure 5:
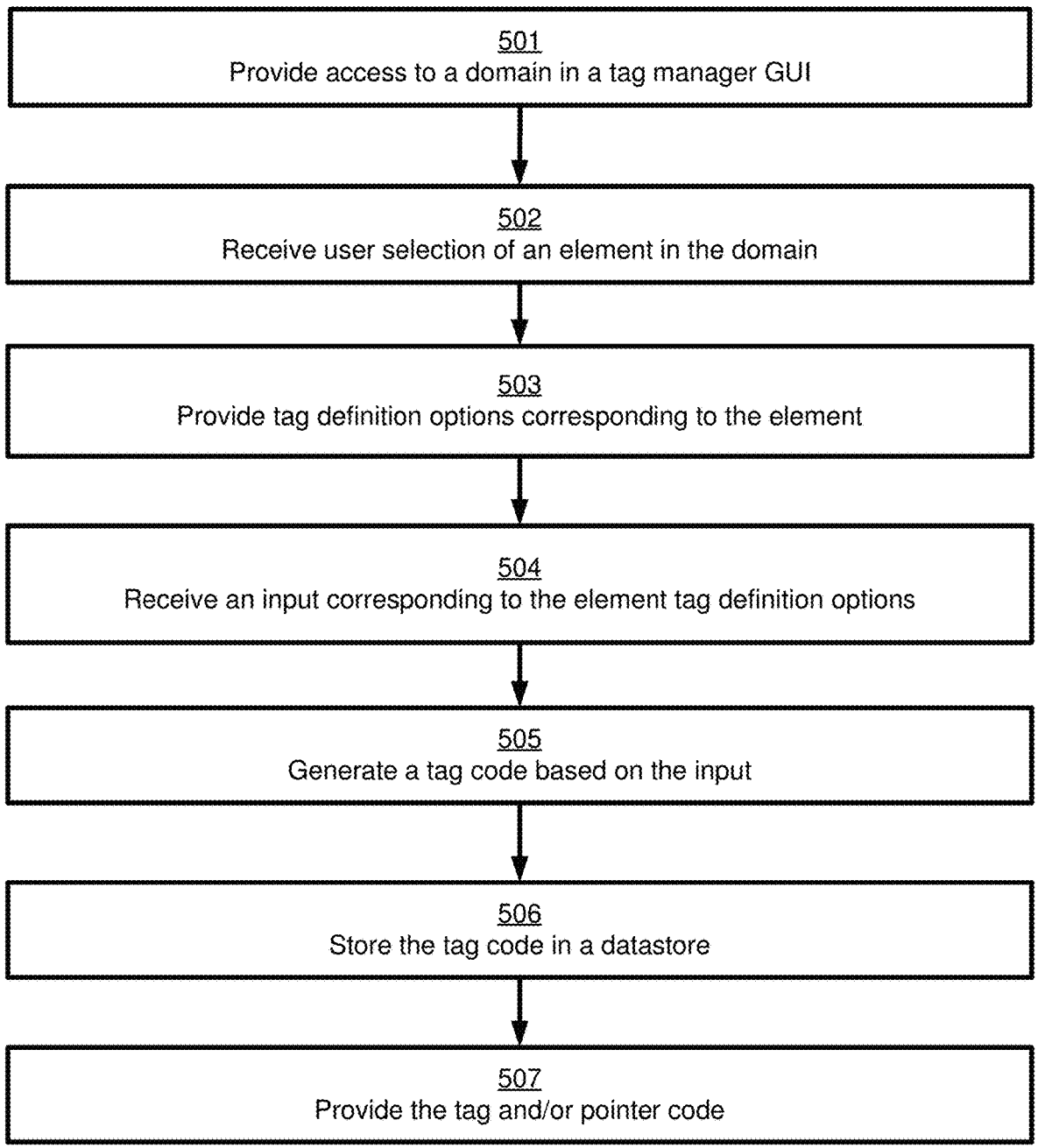
FIG. 5 is a flow chart illustrating an example of a method for visual tag building, in accordance with an embodiment of the invention.

FIG. 5 is a flow chart illustrating a method for visual tag building according to an embodiment of the invention described above with reference to FIG. 1. In some implementations, the steps are performed in an order other than the order presented in FIG. 5. In other implementations, more, fewer, or alternative steps may be performed.

At step 501, tag manager system 160 provides access to domain 110 in container 150 displayed on display device 171. Tag manager system 160 uses an embedding construct such as an iFrame installed in the HTML code of tag manager system 160 to request and obtain access to domain 110 and to display the domain 110 in container 250 on display device 171.

At step 502, tag manager system 160 receives a user selection of element 115 in the domain. In an embodiment, tag user system 170 uses input device 172 to navigate in container 250 displayed on display device 171. Tag user 170 uses normal navigation controls using input device 172 to change the page of domain 110 displayed in container 250, or to move a cursor in domain 110 displayed in container 250. Tag user 170 uses definition controls using input device 172 to select element 115 of domain 110 displayed in container 250 to select or update definition options for the corresponding element tag 116.

At step 503, tag manager system 160 receives a user selection of tag definition options. In an embodiment where tag user system 170 is creating a new element tag 116, tag manager 160 provides tag definitions 160 with the definition option selections unpopulated. In an embodiment where tag user system 170 is updating a previously defined element tag 116, tag manager 160 provides tag definitions 160 with the definition options selections populated with the previously selected definition options.

At step 504, tag manager system 160 receives a user selection of tag definition options corresponding to element 115. The user input may select new tag definition options or may update previously selected definition options.

At step 505, tag manager system 160 generates element tag code 117 corresponding to element 115, based on the selected tag definition options.

At step 506, tag manager system 160 stores element tag code 117 in tag code datastore 140.

At step 507, tag manager system 160 provides element tag code 117 and/or page pointer code 118 to tag user system 170. In an embodiment, tag manager system 160 provides element tag code 117 and/or page pointer code 118 in tag manager interface 200 for display on display device 171. In other embodiments, tag manager system 160 provides element tag code 117 and/or page pointer code 118 to tag user system 170 or to domain 110 over communications network 150. In some embodiments, element tag code 117 comprises pointer code.

Additional Embodiments

In a further embodiment, tag manager system 160 further provides an option to generate and provide code other than element tag code 117 and/or page pointer code 118.

Figure 6A:
FIG. 6A is an example of a consent management popup, in accordance with an embodiment of the invention.
Figure 6B:
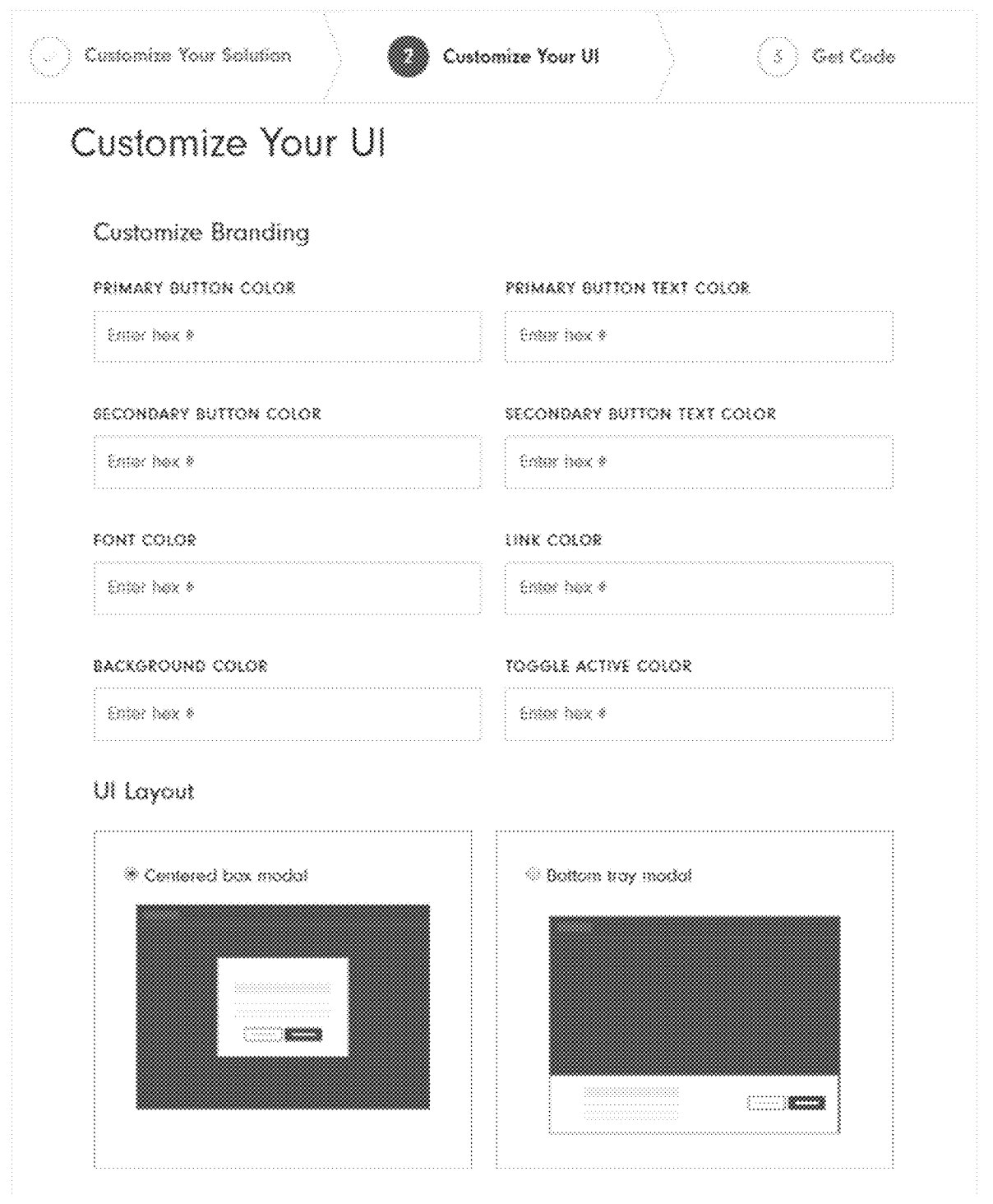

In an example, tag manager system 160 further provides an option to generate and provide HTML code corresponding to a consent management "popup" (or "widget") displayed when entity 120 accesses domain 110. A consent management element is a text and/or graphical element that requests input from entity 120 on domain 110 to select consent management options. An example embodiment of consent management popup 610 is illustrated in FIG. 6A. Tag definition interface module 164 may generate tag definition interface 260 further comprising a consent management definition interface (not shown). A consent management definition interface provides options for tag user system 170 to select or update definition options corresponding to consent management popup 610. An example embodiment of consent management definition interface 620 is illustrated in FIG. 6B. Tag user 170 navigates to and selects element 115, such as a page in domain 110, in container 250, as described above. When tag user system 170 completes selection or updating of consent management definition options, code generation module 165 further generates a consent management code corresponding to the selected consent management options and save the consent management code at least in tag datastore 140 and possibly in tag manager datastore 167. Tag code generation module 165 may further generate and provide the consent management code or a pointer code, as described above with reference to tag code 117, for insertion in the HTML code corresponding to element 115 in domain 110. Tag code generation module 165 may generate page pointer code 118 further corresponding to consent management element 610 on the page of domain 110.

In another example, tag manager system 160 further provides options to retrieve, generate/update, and provide HTML code corresponding to third party code, such as a Moat Analytics tag or a Nielsen® tag. Tag definition interface module 164 may generate tag definition interface 260 further comprising a third party code definition interface (not shown). A third party definition interface provides options for tag user system 170 to select or update definition options corresponding to third party code. When tag user system 170 completes selection or updating of third party code definition options, code generation module 165 retrieves and/or generates and/or updates HTML code corresponding to the selected third party tag options. Code generation module 165 may retrieve third party code from tag datastore 140 or from a third party data store. Code generation module 165 saves the generated and/or retrieved and/or updated third party tag code at least in tag datastore 140 and possibly in tag manager datastore 167. Tag code generation module 165 may provide the generated and/or retrieved and/or updated third party tag code, or a pointer code, as described above with reference to tag code 117, for insertion in the HTML code corresponding to element 115 in domain 110. Tag code generation module 165 may generate page pointer code 118 further corresponding to the generated and/or retrieved and/or updated third party tag code. Advantageously, this embodiment enables tag user system 170 to combine tasks requiring code generation, and enables tag user system 170 to tag domain 110 more quickly than if the tasks were performed separately. It also allows a tag user system 170 who knows very little about third party tag codes to generate and/or retrieve the corresponding code.

In the above examples, container module 163 produces highlights in container 250 for element 115 having corresponding consent management code and/or third party code, as described above. Advantageously, highlighting elements having corresponding consent management code and/or third party code in container 250 enables tag user system 170 to quickly identify such elements in domain 110 and easily review and update the corresponding selected definition options. This reduces the likelihood that tag user system 170 will miss element 115 or incorrectly define consent management code and/or third party code corresponding to element 115.

In another embodiment, tag manager 160 provides an option for tag user to tag element 115 with a "basic" tag. A basic tag may comprise minimal tag definitions, such as a name derived from the HTML code corresponding to element 115 and actions to return a pre-defined set of information to domain 110, an advertiser, or a consumption measurement system. Tag definition interface module 164 generates tag definition interface 260 further comprising a basic tag interface. In an embodiment, the basic tag interface provides tag user the option to select tag definition options to associate with the basic tag; in another embodiment, tag manager system 160 pre-defines the tag definition options associated with the basic tag. When the basic tag option is selected, tag user system 170 assigns the basic tag to element 115 by navigating to and selecting element 115 in container 250, as described above, without having to complete any other selection of definition options. When the basic tag option is selected, selecting element 115 assigns the basic tag to element 115. Tag generation module 165 generates tag code 117 and/or page pointer code 118 corresponding to the basic tag, as described above. Advantageously, this embodiment enables tag user system 170 to tag domain 110 very quickly, enabling a tag user to obtain information about consumer access to domain 110 very quickly. Obtaining consumer information very quickly may enable an advertiser to operate advertising campaigns more quickly and more effectively. It also allows a tag user system 170 who knows very little about domain 110 to quickly set up initial basic tags. It also allows tag user system 170 to obtain information about accesses to elements 115 in domain 110, which may be helpful to select detailed tag definition options corresponding to element tag 116, as described above.

In a further embodiment, tag manager system 160 provides an option for container 250 to highlight element 115 for suggested tagging. Container module 163 generates container 250 to display domain 110, as described above. Container module 163 further uses browser development tools to search the HTML code corresponding to domain 110 for code corresponding to element 115. In examples, container module 163 searches the HTML code for code corresponding to a page element or a graphic element, as shown below:

(a)   window.href="https://www.domain.com/shopping-cart/checkout.html"

(b)<button type="button" class="button pt-intent-none">Check Out</button>

Container module 163 may highlight identified elements, as described above, for suggested tagging. Container module 163 may further use the browser development tools to analyze the HTML code corresponding to identified element 115 to identify the tag type corresponding to element 115. In the examples above, container module 163 identifies sample HTML code (a) as corresponding to a view event and sample HTML code (b) as corresponding to a conversion event. Tag definitions interface module 164 may auto-populate the options in tag definition selection interface 306 with the options corresponding to the identified tag type, as described above. In a further embodiment, code generation module 165 automatically generates element tag code 117 based on the autopopulated options corresponding to the identified tag type.

In a particular aspect of this embodiment, tag manager system 160 identifies element 115 for suggested tagging depending on the group selected by tag user system 170 or determined by tag manager system 160, as described above. In an example, tag manager system 160 may highlight element 115 for tagging in publisher group mode but not in advertiser group mode.

Advantageously, this embodiment enables tag user system 170 to identify and tag elements 115 in domain 110 more tag domain more quickly. In addition, this embodiment reduces the likelihood that tag user system 170 will miss element 115 or incorrectly tag element 115. Finally, this embodiment will enable a tag user system 170 who knows very little about domain 110 to identify element 115 and/or select tag definition options corresponding to element 115.

In a further embodiment, tag manager system 160 provides an option to view actions taken by the browser when entity 120 accesses tagged element 115 and validate the selected definitions for element tag 116 corresponding to tagged element 115. Tag definition interface module 165 generates tag definition interface 260 further comprising a validate action interface (not shown) providing options to validate element tag 116. In definition mode, a user selects a validate option in the validate action interface, then selects element 115 in container 250, then selects a run option in the validate action interface. Upon selection of the run option, container module 163 accesses domain 110 using normal navigation commands to activate element 115 (for example, by clicking on element 115). Then container module 163 accesses domain 110 using developer tools (i.e., native browser functions, such as developer tool extensions), to retrieve the results of the activation of element 115 and provide the results for display in the validated action interface. Based on the results of validation, tag user 170 may update selected tag definitions corresponding to element tag 116. Advantageously, this allows the user to quickly validate, and update if necessary, the selected definitions corresponding to element 115 without moving back and forth between tag manager 160 and domain 110.

Figure 7:
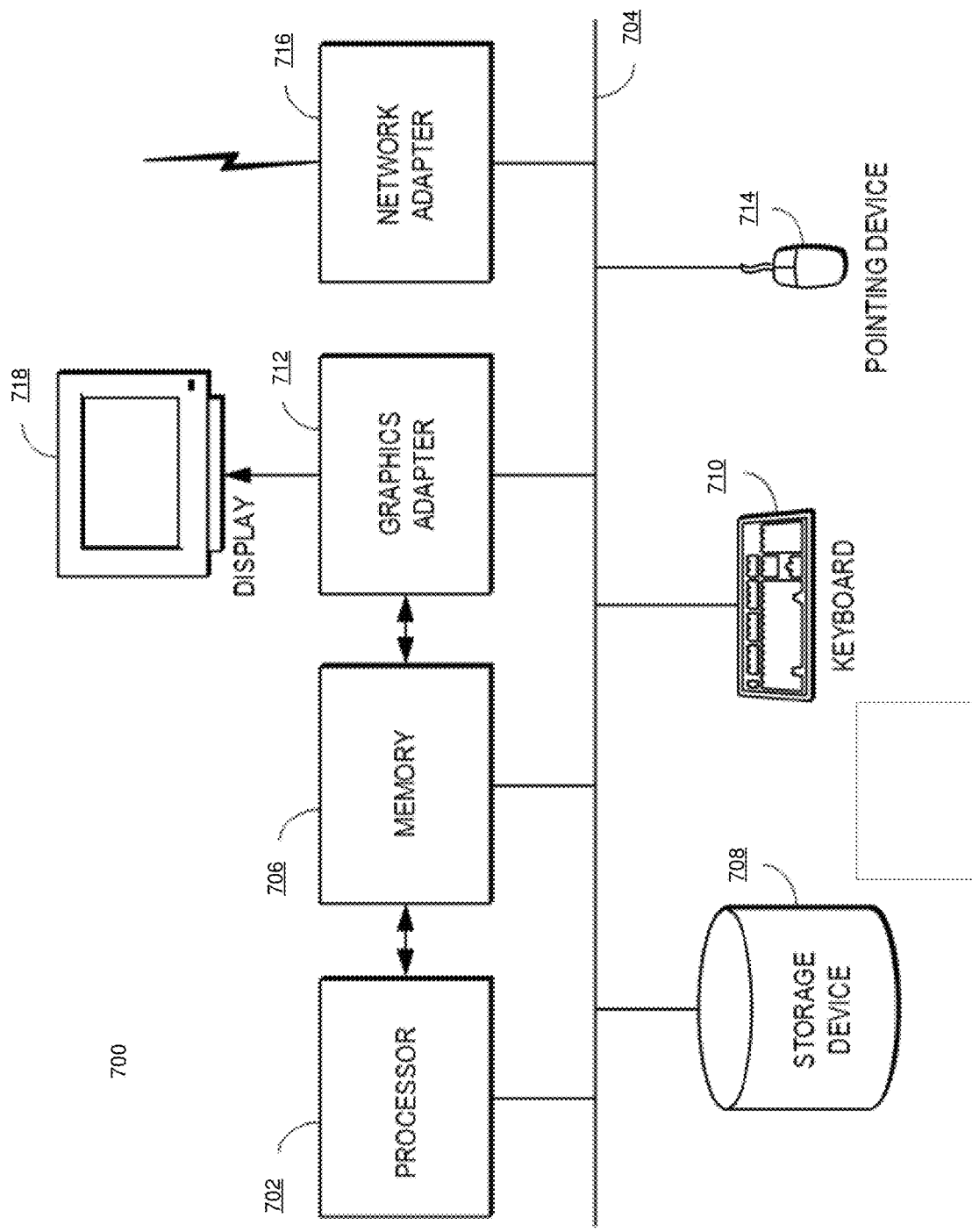
FIG. 7 is a high-level block diagram illustrating an example of a computer for use as a domain, entity, tag code datastore, or tag manager system of FIG. 1.

FIG. 7 is a high-level block diagram illustrating an example of a computer for use as domain 110, entity 120, tag code datastore 140, tag user system 170, display device 171, input device 172, or tag manager system 160 of FIG. 1. Illustrated are a processor 702 coupled to a bus 704. Also coupled to the bus 704 are a memory 706, a storage device 708, a keyboard 710, a graphics adapter 712, an input device 714, and a network adapter 716. A display 618 is coupled to the graphics adapter 612.

FIG. 7 comprises a processor 702 which may be any general-purpose processor. The storage device 708 is, in one embodiment, a hard disk drive but can also be any other device capable of storing data, such as a writeable compact disk (CD) or DVD, or a solid-state memory device. The memory 706 may be, for example, firmware, read-only memory (ROM), non-volatile random access memory (NVRAM), and/or RAM, and holds instructions and data used by the processor 702. The input device 714 may be a mouse, track ball, stylus, touchscreen, or other type of input device, and is used in combination with the keyboard 710 to input data into the computer 700. The graphics adapter 712 displays images and other information on the display 718. The network adapter 716 couples the computer 700 to the network (not shown). In one embodiment, the network is the Internet. The network can also utilize dedicated or private communications links that are not necessarily part of the Internet.

As is known in the art, the computer 700 is adapted to execute computer program modules. As used herein, the term "module" refers to computer program logic and/or data for providing the specified functionality. A module can be implemented in hardware, firmware, and/or software. In one embodiment, the modules are stored on the storage device 708, loaded into the memory 706, and executed by the processor 702. The computer 700 is configured to perform the specific functions and operations by various modules, for example as detailed in FIG. 1, and thereby operates as a particular computer under such program control. The types of computers 700 utilized by the entities of FIG. 1 can vary depending upon the embodiment and the processing power utilized by the entity.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

The invention claimed is:

1. A method of tagging a first web domain using a tag manager system hosted on a second web domain, comprising:
   providing in the second domain a tag manager graphical user interface comprising a container and a tag definition graphical user interface;
   providing access to the first web domain in the container; and
   responsive to a user navigating in the container to an element in the first web domain:
      providing, in the tag definition graphical user interface, tag definition options; and
      responsive to an input from the user in the tag definitions graphical user interface:
         selecting tag definition options; and
         generating a tag code, wherein the tag code defines an action, according to the selected tag definition options, to be taken when a browser interacts with the element in the first web domain.

2. The method of claim 1, wherein providing, by the tag manager system, access to the first web domain in the container, comprises:
inserting a Uniform Resource Locator ("URL") corresponding to the first domain in an inline frame element ("iFrame") installed in an HTML code of the tag manager; and
displaying the first domain in the container according to the corresponding domain development software of the first web domain.

3. The method of claim 1, wherein selecting the tag definition options comprises:
determining, by the tag manager system, a selection of tag definition options.

4. The method of claim 1, wherein navigating, in the container, to the element in the first web domain comprises accessing, by the tag manager system, browser development tools corresponding to the first web domain.

5. The method of claim 1, wherein generating the tag code further comprises:
storing the tag code in a data store; and
generating a pointer code pointing to the tag code stored in the data store, wherein the pointer code instructs the browser to retrieve the tag code when the browser interacts with the element in the first domain.

6. The method of claim 1, further comprising providing the tag code to the user.

7. The method of claim 1, wherein the tag code is a script to be inserted in the corresponding HTML code of the first web domain.

8. A system comprising:
a processor;
a non-transitory computer-readable storage medium storing processor-executable computer program instructions that, when executed, cause a computer processor to perform a method of tagging a first web domain using a tag manager system hosted on a second web domain, the method comprising:
providing in the second domain a tag manager graphical user interface comprising a container and a tag definition graphical user interface;
providing access to the first web domain in the container; and
responsive to a user navigating in the container to an element in the first web domain:
providing, in the tag definition graphical user interface, tag definition options; and
responsive to an input from the user in the tag definitions graphical user interface:
selecting tag definition options; and
generating a tag code, wherein the tag code defines an action, according to the selected tag definition options, to be taken when a browser interacts with the element in the first web domain.

9. The system of claim 8, wherein providing, by the tag manager system, access to the first web domain in the container, comprises:
inserting a Uniform Resource Locator ("URL") corresponding to the first domain in an inline frame element ("iFrame") installed in an HTML code of the tag manager; and
displaying the first domain in the container according to the corresponding domain development software of the first web domain.

10. The system of claim 8, wherein selecting the tag definition options comprises:
determining, by the tag manager system, a selection of tag definition options.

11. The system of claim 8, wherein navigating, in the container, to the element in the first web domain comprises accessing, by the tag manager system, browser development tools corresponding to the first web domain.

12. The system of claim 8, wherein generating the tag code further comprises:
storing the tag code in a data store; and
generating a pointer code pointing to the tag code stored in the data store, wherein the pointer code instructs the browser to retrieve the tag code when the browser interacts with the element in the first domain.

13. The system of claim 8, wherein the method further comprising providing the tag code to the user.

14. The method of claim 8, wherein the tag code is a script to be inserted in the corresponding HTML code of the first web domain.

15. A non-transitory computer-readable storage medium storing processor-executable computer program instructions that, when executed, cause a computer processor to perform a method of tagging a first web domain using a tag manager system hosted on a second web domain, the method comprising:
providing in the second domain a tag manager graphical user interface comprising a container and a tag definition graphical user interface;
providing access to the first web domain in the container; and
responsive to a user navigating in the container to an element in the first web domain:
providing, in the tag definition graphical user interface, tag definition options; and
responsive to an input from the user in the tag definitions graphical user interface:
selecting tag definition options; and
generating a tag code, wherein the tag code defines an action, according to the selected tag definition options, to be taken when a browser interacts with the element in the first web domain.

16. The medium of claim 15, wherein providing, by the tag manager system, access to the first web domain in the container, comprises:
inserting a Uniform Resource Locator ("URL") corresponding to the first domain in an inline frame element ("iFrame") installed in an HTML code of the tag manager; and
displaying the first domain in the container according to the corresponding domain development software of the first web domain.

17. The medium of claim 15, wherein selecting the tag definition options comprises:
determining, by the tag manager system, a selection of tag definition options.

18. The medium of claim 15, wherein navigating, in the container, to the element in the first web domain comprises accessing, by the tag manager system, browser development tools corresponding to the first web domain.

19. The medium of claim 15, wherein generating the tag code further comprises:
storing the tag code in a data store; and
generating a pointer code pointing to the tag code stored in the data store, wherein the pointer code instructs the browser to retrieve the tag code when the browser interacts with the element in the first domain.

20. The medium of claim 15, wherein the method further comprising providing the tag code to the user.

21. The method of claim 15, wherein the tag code is a script to be inserted in the corresponding HTML code of the first web domain.

* * * * *